United States Patent [19]

DiIulio et al.

[11] Patent Number: 4,911,398
[45] Date of Patent: Mar. 27, 1990

[54] TROLLING MOTOR MOUNTING APPARATUS

[75] Inventors: Dale S. DiIulio, Fond du Lac; Robert H. Boede, Omro, both of Wis.

[73] Assignee: Brunswick Corporation, Skokie, Ill.

[21] Appl. No.: 199,136

[22] Filed: May 26, 1988

[51] Int. Cl.⁴ ............................................. F16M 13/00
[52] U.S. Cl. ...................... 248/642; 74/109; 440/6
[58] Field of Search .............. 248/429, 640, 642, 286, 248/395; 440/6, 53, 60; 74/109

[56] References Cited

U.S. PATENT DOCUMENTS

| | | | |
|---|---|---|---|
| 899,796 | 9/1908 | Osmer | 74/109 |
| 1,365,182 | 1/1921 | Melchior | 74/109 X |
| 2,985,031 | 5/1961 | Bennett | 74/109 X |
| 3,007,668 | 11/1961 | Dall | 248/429 |
| 3,063,464 | 11/1962 | Jones | 440/53 |
| 3,507,472 | 4/1970 | Agee et al. | 248/429 |
| 3,874,318 | 4/1975 | Langley . | |
| 3,948,204 | 4/1976 | Brock et al. | 248/642 X |
| 3,999,500 | 12/1976 | Friedel et al. . | |
| 4,279,553 | 7/1981 | Cleary | 74/109 X |
| 4,410,161 | 10/1983 | Booty . | |
| 4,708,670 | 11/1987 | Peters | 248/642 X |

Primary Examiner—David L. Talbott
Attorney, Agent, or Firm—Andrus, Sceales, Starke & Sawall

[57] ABSTRACT

An apparatus for mounting an outboard trolling motor to a boat for movement of the motor between a horizontal stowed position and a vertical operating position includes a track-mounted carriage which supports the motor for reciprocal movement along a horizontal boat surface, such as a deck, and a pivoting mechanism at the end of the track to tilt the motor and its mounting to a vertical operating position. The pivotal mechanism may comprise a curved track section coextensive with the horizontal track, or a split carriage mechanism in which the motor mounting portion is pivotable with respect to the track engaging carriage portion through the operation of a rack and pinion mechanism at the end of the track.

6 Claims, 2 Drawing Sheets

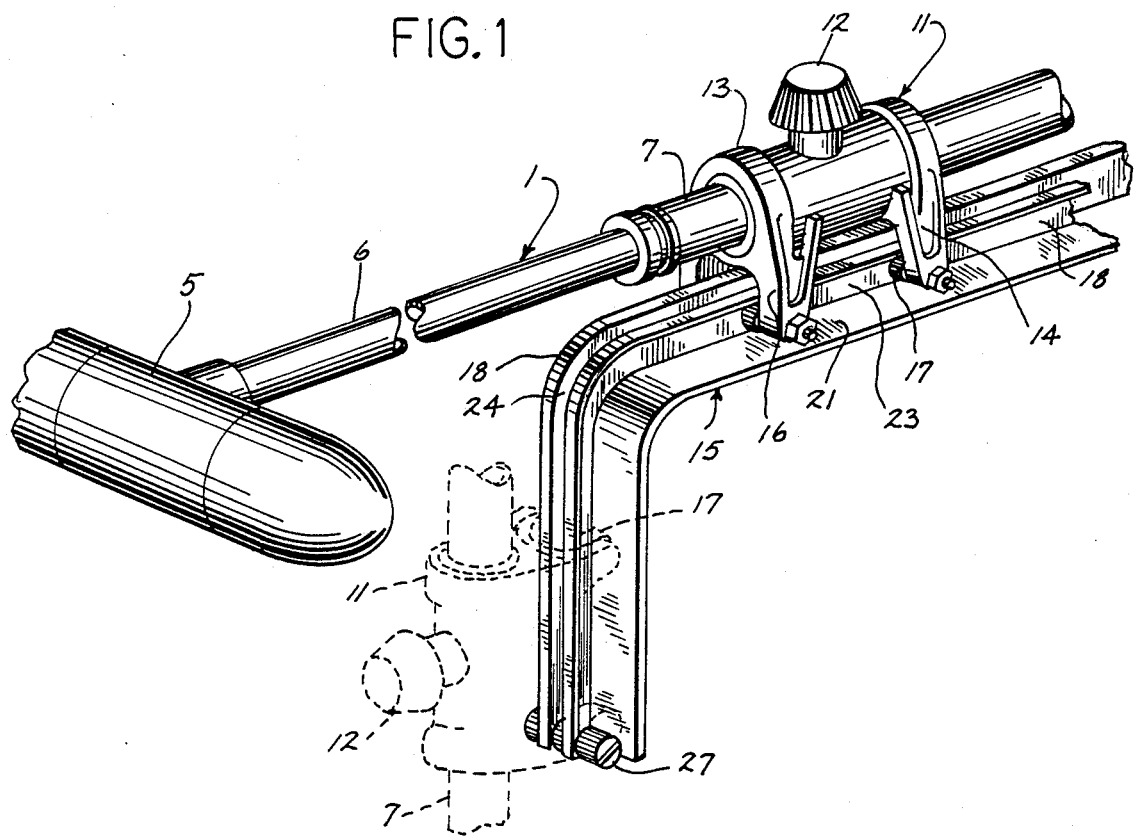
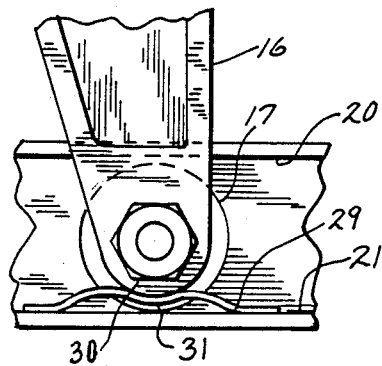
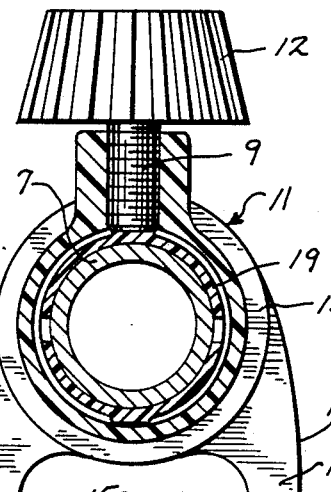
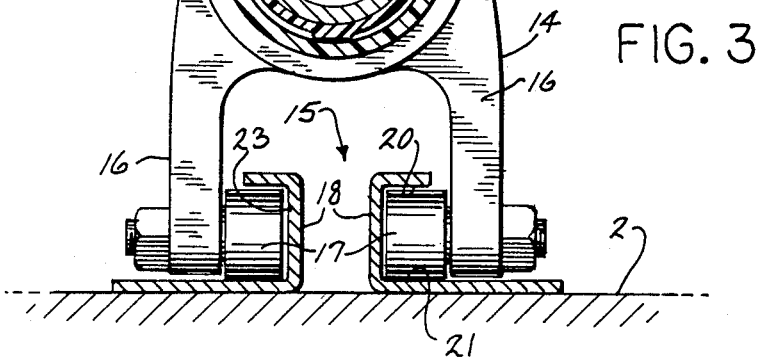

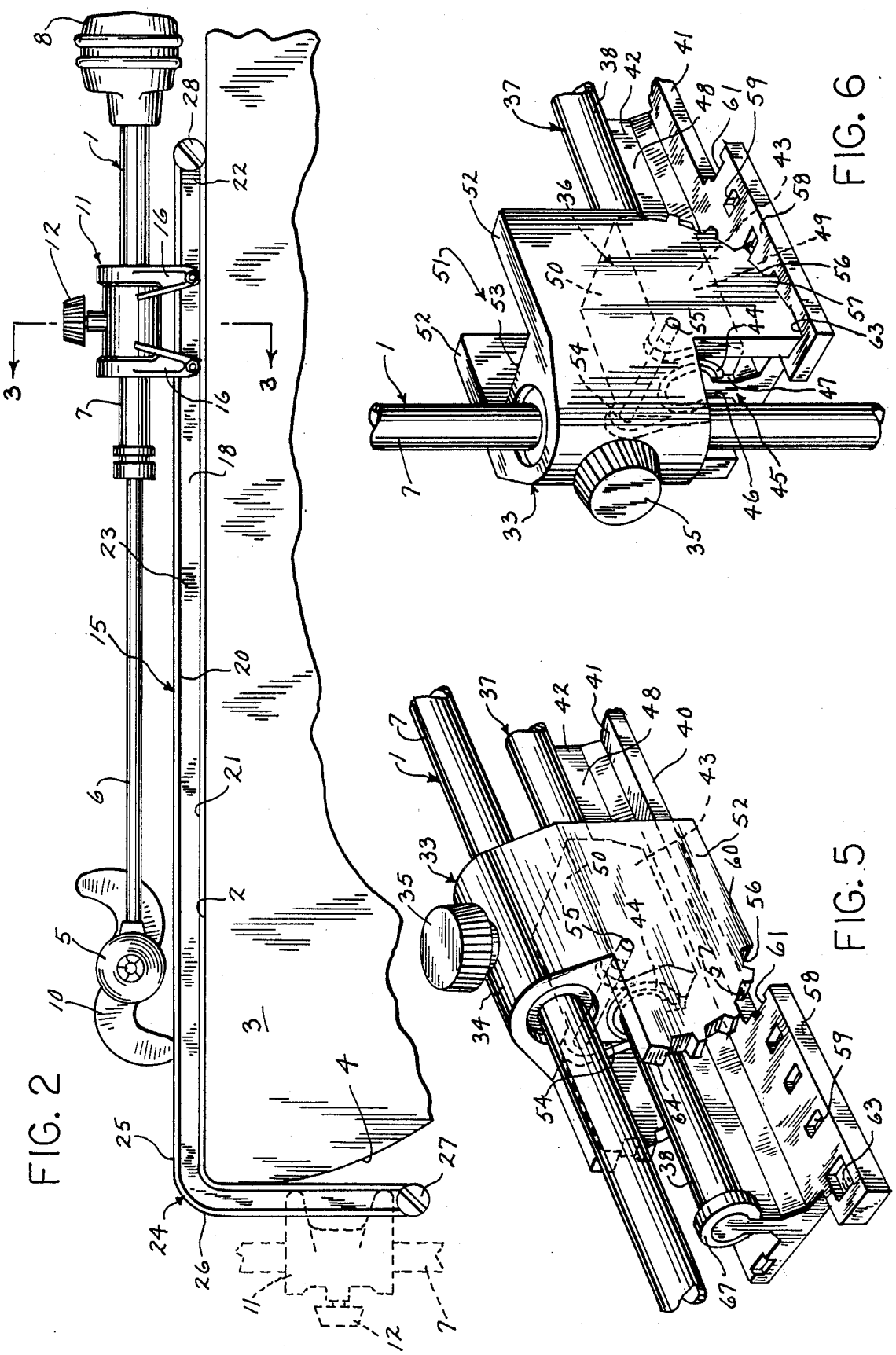

TROLLING MOTOR MOUNTING APPARATUS

BACKGROUND OF THE INVENTION

The present invention relates to electric trolling motors for boats and, more particularly, to an apparatus for mounting an outboard trolling motor to a boat for moving the motor between a horizontal stowed position in the boat and a vertical operating position in the water.

Small electric trolling motors are well known in the art and have been used for many years to provide slow speed movement and maneuverability for various types of small watercraft. In most cases, the boat or other watercraft utilizing an electric trolling motor will have a larger internal combustion engine, such as an outboard motor, as its primary source of motive power. Thus, trolling motors are usually used only to provide slow speed action to baits or lures trolled behind the boat, to maneuver the boat into position, or to maintain the boat in position against drifting or movement in a current.

When not in use, an electric trolling motor is usually raised out of the water by pivoting on its mount and allowing it to lie in a generally horizontal position in or on the boat. Two types of electric trolling motors are in common use, namely, deck-mounted and transom-mounted motors. A deck-mounted motor is usually attached to the forward horizontal deck and includes a specially designed pivotal support apparatus for moving the motor between its operative and stowed positions and holding it in either of the selected positions. Examples of such support apparatus for deck-mounted motors are shown in U.S. Pat. Nos. 3,999,500 and 4,410,161. The earlier patent discloses a pivotal arm interconnecting the motor and a deck bracket, which arm is adapted to rotate through a 180° arc to carry the motor between the two positions. The support arm also includes an internal gear mechanism to rotate the motor axially for proper orientation in the operative and stowed positions, as well as to lock the motor in these positions. The latter patent shows a pivotal linkage by which the motor is attached to a deck bracket, which linkage is similarly rotatable through a 180° arc to move the motor between its horizontal stowed and vertical operating positions. Although the apparatus described in each of the foregoing patents has operated satisfactorily and gained wide acceptance, the mechanical gearing and linkages are complex and the apparatus somewhat cumbersome to operate.

SUMMARY OF THE INVENTION

The present invention is directed to a mounting apparatus for an outboard trolling motor for moving the motor between a generally horizontal stowed position and a generally vertical operating position, which apparatus is of relatively simple construction and easy to operate.

The apparatus includes a motor mounting bracket to which the motor is attached by its connecting tube. The mounting bracket, in turn, is supported by a generally horizontal track section which may, for example, be attached to the deck of a boat. The mounting bracket is adapted for reciprocal movement along the track section. At one of the track section, disposed for example at the forward end of the deck, is a pivot mechanism which is operable in response to movement of the mounting bracket along the track to pivot the bracket and the attached motor to the generally vertical operating position.

The mounting bracket preferably comprises a carriage portion engaging the track section and a motor support means for holding the motor with the longitudinal axis of the connecting tube disposed generally parallel to the track section. In one embodiment, the track section comprises a flanged rail member engageable by tracking wheels on the carriage. The flanged rail member preferably includes spaced tracking surfaces between which the carriage tracking wheels operate. In this embodiment, the pivot mechanism comprises a curved extension of the horizontal track section including a downwardly depending vertical end which, when traversed by the carriage, causes the mounting bracket and attached motor to pivot to an upright, vertically disposed operating position.

In an alternate embodiment, the horizontal track section comprises a sliderail and the carriage includes a sleeve which substantially surrounds the sliderail for reciprocal sliding movement along it. In this embodiment the motor support means is pivotally attached to the carriage such that the motor support means and attached trolling motor may rotate relative to the carriage and the sliderail on which it is mounted. Fixed abutment means are disposed at one end of the horizontal sliderail and are engageable by the motor support means in response to movement of the carriage to the end of the sliderail, whereby such engagement effects rotation of the motor support means about its pivotal connection from a horizontal to a generally vertical operating position. The fixed abutment means preferably comprises a rack and the motor support means includes a rack-engaging pinion section concentric with the pivotal connection to effect rotation of the motor support means.

The trolling motor mounting apparatus, in either of its embodiments, may be operated by hand or may be motorized to allow remote operation from a location elsewhere in the boat.

BRIEF DESCRIPTION OF THE DRAWINGS

FIG. 1 is a perspective view of one embodiment of the trolling motor mounting apparatus of the present invention.

FIG. 2 is a side elevation of the trolling motor and motor mounting apparatus shown in FIG. 1.

FIG. 3 is a vertical section through the motor mounting bracket taken on line 3—3 of FIG. 2.

FIG. 4 is an enlarged side elevation of part of the mounting bracket of FIG. 3 showing the retaining means for the carriage.

FIGS. 5 and 6 are perspective views of an alternate embodiment of the trolling motor mounting apparatus illustrating the horizontal stowed position and the pivoted vertical operating position.

DETAILED DESCRIPTION OF THE PREFERRED EMBODIMENTS

In the drawing, a trolling motor 1 is mounted on the deck 2 of a boat 3 adjacent the bow 4. The motor 1 includes a lower unit 5 secured to the lower end of a connecting tube 6 which, in turn, is rotatably mounted within a swivel tube 7, the upper end of which terminates in a control head 8. The lower unit 5 houses an electric drive motor which is adapted to drive a propeller 10 in a conventional manner.

The control head 8 is rigidly attached to the upper end of the connecting tube 6 to rotate together within the swivel tube 7. The swivel tube, in turn, is held within a mounting bracket 11 within which it may be slid axially and its selected position held by a position control knob 12. Control knob 12 includes a set screw 9 which operates a clamping collar 19 within the mounting bracket 11 and surrounding the swivel tube 7 in a conventional manner.

The mounting bracket 11 of the embodiment shown in FIGS. 1 through 4 includes a motor support portion 13 and an integral carriage 14. The mounting bracket is attached by the carriage 14 to a horizontal track section 15 which is fixed to the deck 2. Each side of the carriage includes a pair of integral downwardly depending legs 16 to the lower end of each of which is attached a rotatable tracking wheel 17. The four tracking wheels 17 are disposed in laterally spaced, axially aligned pairs.

The track section 15 includes a laterally spaced pair of rails 18 of generally C-shaped cross section. Each rail 15 includes parallel, vertically spaced upper and lower tracking surfaces 20 and 21, respectively. The vertical spacing between the upper and lower tracking surfaces 20 and 21 is slightly larger than the diameter of the tracking wheels 17. The mounting bracket 11 is mounted on the track section 15 by sliding the tracking wheels into the open horizontal end 22 of the rails 18. When so mounted, the carriage is free to roll along the lower tracking surface 21, is restrained from vertical displacement by the upper tracking surface 20, and from lateral displacement by the vertical web 23 interconnecting the upper and lower tracking surfaces of the rails 18.

The horizontal track section 15 extends from the open end 22 of the rails 18 across the deck 2 to the bow 4 of the boat. To pivot the mounting bracket and the attached trolling motor 1 from the horizontal stowed position to the vertical operating position, a curved track section 24 is provided coextensive with the horizontal track section 15. The curved track section 24 traverses a 90° arc from a horizontal tangent portion 25 where it joins one end of the horizontal track section to a vertical tangent portion 26 at its opposite end. The curved section 24 must have a large enough radius to allow the axially aligned pairs of tracking wheels 17 to traverse the curve without binding and without the underside of the motor support portion 13 of the mounting bracket 11 engaging the radially outer surface of the curved section.

The vertical tangent portion 26 preferably extends downwardly a sufficient distance to permit the trailing pair of tracking wheels to completely exit the curved section 24 so the mounting bracket and attached motor assume a full vertical operating position. A vertical stop 27 is mounted on the lower end of the vertical tangent portion 26 to be engaged by the carriage 14 to establish and retain it in the operating position. The vertical stop 27 may include an adjustable clamping mechanism enabling its to be selectively positioned along the vertical tangent portion. An adjustable vertical stop could be used as a supplement to or in lieu of the position control knob 12 of the mounting bracket 11 to vary the vertical position of the trolling motor. Because of the low speed an light load operating conditions of a typical trolling motor, the mounting bracket may simply rest on the vertical stop 27 without the need for any supplemental securing means.

To return the motor from the vertical operating to the stowed horizontal position, the mounting bracket and attached motor are simply caused to move in a reverse direction with the carriage 14 traversing the vertical, curved, and horizontal sections of the track, as previously indicated. The open ends 22 of the horizontal rails 18 provide easy removal of the mounting bracket 11 and attached trolling motor 1. Such demountable attachment is most convenient when, for example, the trolling motor is not needed or the boat s being trailered or stored. It may, however, be desirable to provide some means to prevent unintentional or inadvertent movement of the mounting bracket carriage 14 off the end of the horizontal track section 15. A horizontal stop 28, similar to the vertical stop 27, may be attached to the horizontal track section 15 near the open end 22 thereof to provide this function. As with the previously described vertical stop, the horizontal stop 28 may also be adjustable to change its horizontal position along the track. It is also preferable that the stop 28 be completely demountable to allow the motor to be removed from the track system, as indicated above.

In lieu of or as a supplement to the horizontal stop 28, means may be provided to hold the carriage in a stowed position against movement in either direction along the track section. Any of various types of pawl and catch or similar retaining devices may be utilized for this purpose. For example, a catch may be attached to one of the rails 18 near the open horizontal end thereof, which catch is engageable by a releasable pawl depending downwardly from the carriage 14. A somewhat more simple alternate holding mechanism is shown in FIG. 4 and includes a spring-biased detent 29 mounted on the lower tracking surface 21 of one of the rails 18, adapted to be deflected by contact with the lower end 30 of a rearwardly disposed leg 16 on the carriage and to retain the end 30 in a depressed center section 31. Disengagement of the holding mechanism is effected by forcibly moving the carriage to cause the detent 29 to be deflected and the lower end 30 of the leg 16 to pass thereover. Such holding arrangements are particularly desirable to prevent forward and aft movement of the motor along the deck as a result of movement of the boat.

In the alternate embodiment shown in FIGS. 5 and 6, the mounting bracket 33 includes a motor support portion 34 essentially identical to that in the embodiment previously described. Thus, the motor support portion 34 is adapted to slidably receive the swivel tube 7 of the trolling motor 1 and clamp it in a selected vertical position through operation of a position control knob 35.

The mounting bracket 33 also includes a lower carriage 36 designed to be mounted on and move along a horizontal track section 37. The track section comprises a single sliderail 38 of circular cross section. The sliderail 38 is disposed parallel to and spaced above the deck of the boat by a sliderail support 40. The support 40 runs substantially the full length of the sliderail 38 and includes a base member 41 for attachment to the deck and a centrally disposed upstanding center member 42 to which the sliderail 38 is rigidly mounted.

The carriage 36 includes a housing 43 which holds a substantially cylindrical bearing sleeve 44 adapted to be mounted on and surround the sliderail 38 for reciprocal sliding movement therealong. The bearing sleeve 44 may include any of various types of anti-friction bearings or bearing surfaces. Preferably, however, the bearing sleeve includes linear ball bearings of a type well known in the art which are mounted within the sleeve to bear directly on the surface of the slide rail 38 in a typical circulating orientation. To accommodate the upstanding center member 42 of the slide rail support 40, the carriage includes an open longitudinal slot 45 on its underside and the bearing sleeve 44 is correspondingly split to define an axial slot 46. The longitudinal slot 45 in the carriage 36 and the axial slot 46 in the bearing sleeve 44 are coextensive and extend the full length of the carriage. The opposite edges of the bearing sleeve defining the axial slot 46 are provided with longitudinal strips of an anti-friction bearing material 47 which bear against the lateral faces 48 of the center member 42 as the carriage moves along the slide rail 38. The bearing material may comprises polytetrafluoroethylene. The bearing strips are adapted to absorb the lateral thrust load resulting from the tendency of the mounting bracket and attached motor to rotate on the slide rail 38.

The motor support portion 34 of the mounting bracket 33, in the embodiment shown in FIGS. 5 and 6, is separate from the carriage 36. The housing 43 comprising the body of the carriage 36 has a generally block-like structure including opposite vertically disposed side faces 49 and a horizontal upper bearing surface 50. The motor support portion 34 of the mounting bracket 33 is adapted to overlie the carriage 36 when the motor is disposed in its horizontal stowed position, as shown in FIG. 5. The motor support portion 34 includes a downwardly depending saddle 51 which includes a pair of vertically disposed side flanges 52 adapted to lie closely adjacent the side faces 49 of the carriage hosing 43, and an upper support surface 53 adapted to overlie and be supported by the upper bearing surface 50 of the carriage housing 43. The block-like carriage housing is adapted to lie within the saddle 51 with a close sliding fit in a manner to firmly support the trolling motor and to key it against any lateral displacement.

The motor support portion 34 of the mounting bracket is provided with a laterally disposed horizontal pivot such that it may be rotated with respect to the carriage in the vertical plane through the centerline of the slide rail 38. The pivotal movement of the motor support portion 34 allows the motor to be tilted to a generally vertically disposed operating position while the carriage 36 remains slidably attached to the slide rail 38. To effect the pivotal attachment between the motor support portion and the carriage, the forward end of the carriage housing 43 includes a pair of upwardly extending pivot ears 54 having axially aligned holes therethrough which are also aligned with holes in the opposite sides of the saddle 51 for receipt of a pivot pin 55 extending the full width of the saddle.

The forward portion of each side flange 52 of the saddle 51 is provided with a pinion apparatus 56 comprising a 90° segment of a circular tooth pattern concentric with the axis of the pivot pin 55. The slide rail 38 and its support 40 extend to the forward edge of the deck or to whatever edge of the boat from which it is desired to extend the motor downwardly into the water for operation. Laterally adjacent each side of the slide rail 38 at its end and preferably comprising an integral lateral extension of the base member 41 is a tooth-engaging rack 58, including tooth receiving recesses 59 aligned with and having a pitch equal to that of the pattern of the teeth 57 on the pinion 56.

As the mounting bracket is slid along the slide rail 38 toward the end thereof, the lowermost toothface 60 of the pinion teeth 57 will engage the aft-facing open recess 61 comprising the first of the tooth-receiving recesses in the rack 58. As movement of the mounting bracket toward the end of the slide rail continues, successive engagement between the pinion teeth 57 and the recesses 59 in the rack will cause the motor support portion 34 of the mounting bracket to rotate about the pivot pin 55 and carry the trolling motor with it through an approximately 90° arc to its vertically disposed operating position shown in FIG. 6. To prevent further pivotal movement beyond the vertically disposed position, the end of the sliderail includes a stop abutment 62 to engage the forward face of the carriage housing 43 and halt movement of the carriage in the forward direction. An alternate stop arrangement may be provided with an enlarged tooth recess 63 at the end of the rack 58 which recess is adapted to receive and capture an enlarged last tooth 64 on the pinion 56.

As with the embodiment shown in FIGS. 1 through 4, the mounting bracket and motor may be slid off of the aft end of the sliderail for convenient removal of the motor. The sliderail may also be provided with an adjustable horizontal stop similar to the horizontal stop 28 described with respect to the other embodiment. Similarly, the carriage housing 43 and sliderail support 40 may be provided wit a retaining mechanism such as the detent arrangement 29-31 shown in FIG. 4, to hold the motor in its stowed position against inadvertant displacement along the sliderail.

Various modes of carrying out the invention are contemplated as being within the scope of the following claims particularly pointing out and distinctly claiming the subject matter which is regarded as the invention.

We claim:
1. Apparatus for mounting an outboard trolling motor to a water craft for movement of the motor between a generally horizontal stowed position and a generally vertical operating position comprising:
   a motor mounting bracket;
   a generally horizontal track section supporting the mounting bracket and the motor in the stowed position, said mounting bracket including a carriage having means for engaging said track section to hold the carriage on said track section for reciprocal movement and motor support means for holding the motor with its longitudinal axis disposed generally parallel to said track section;
   pivot means mounting said motor support means to said carriage for rotation of said motor support means relative to said carriage and operable in response to movement of said carriage along said track section to pivot said bracket and motor to the vertical operating position; and,
   fixed abutment means at said one end of the horizontal track section engageable by said motor support means in response to movement thereof to said one end for effecting rotation of said motor support means about said pivot means to said vertical operating position, said motor being maintained in a horizontal position on said motor support means as said carriage moves along said track section until initial engagement with said abutment means, further movement of the carriage effects said rotation of the motor support means.
2. The apparatus as set forth in claim 1 wherein said fixed abutment means comprises a rack, and said motor support means includes a pinion concentric with said pivot means and adapted to engage said rack for effecting said rotation.

3. The apparatus as set forth in claim 2 wherein said pinion comprises a 90° segment of a circular tooth pattern.

4. The apparatus as set forth in claim 3 wherein said rack includes tooth-receiving recesses aligned with and having a pitch corresponding to that of the tooth pattern of said pinion segment.

5. The apparatus as set forth in claim 2 wherein said horizontal track section comprises a sliderail, and said means for engaging the track section comprises a bearing sleeve substantially surrounding said sliderail for reciprocal sliding movement along said sliderail.

6. The apparatus as set forth in claim 5 wherein said sliderail has a circular cross section and said bearing sleeve is generally cylindrical and includes an anti-friction interior surface in engagement with the surface of said sliderail.

* * * * *